V. S. GAINES.
MECHANICAL TOY.
APPLICATION FILED MAR. 20, 1920.
Reissued June 29, 1920.
14,902.
2 SHEETS—SHEET 1.
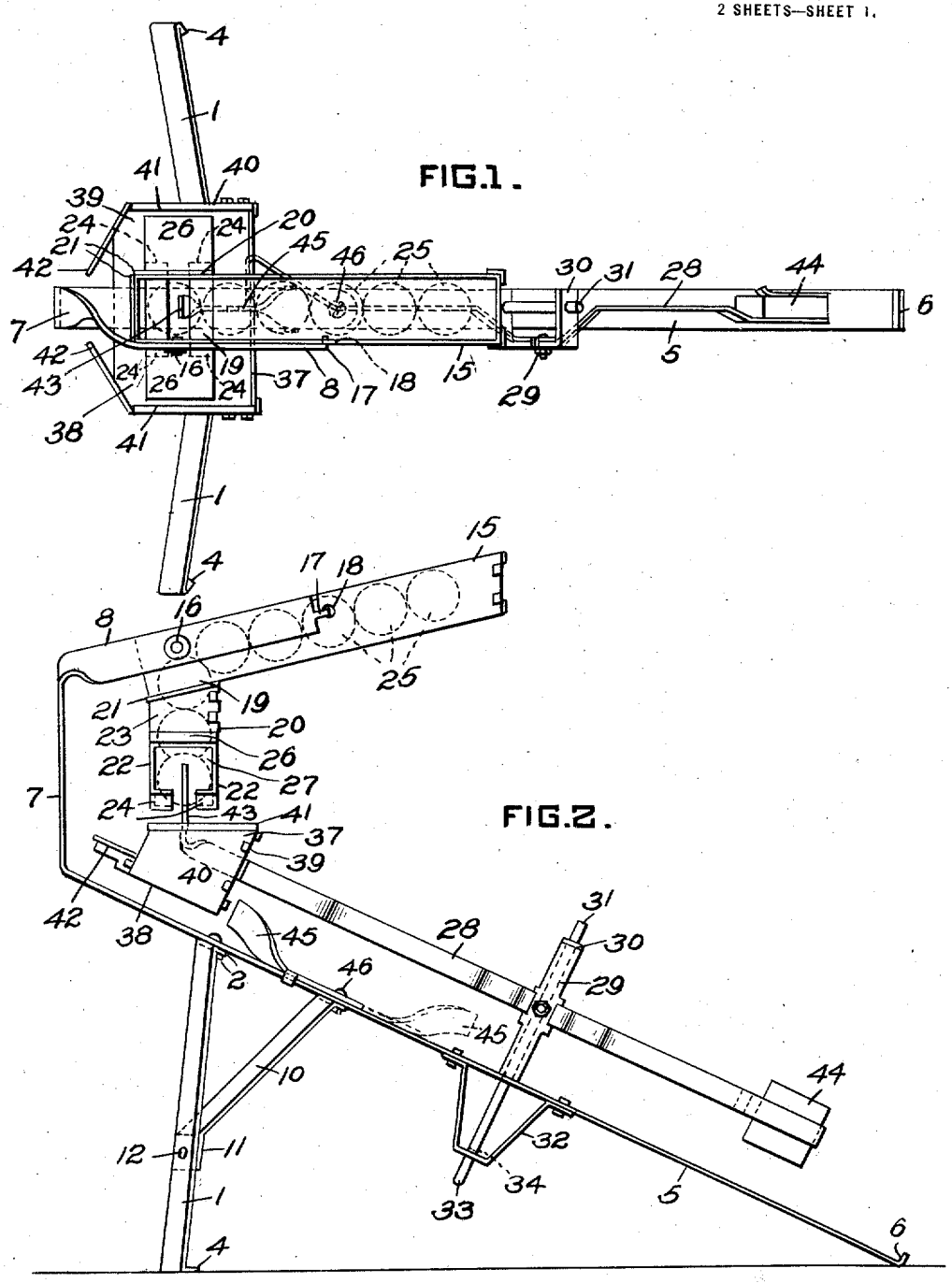
WITNESSES
J. Herbert Bradley.
INVENTOR
Vincent S. Gaines,
By Hinkle & Brown,
Attorneys V. S. GAINES.
MECHANICAL TOY.
APPLICATION FILED MAR. 20, 1920.
Reissued June 29, 1920.
14,902.
2 SHEETS—SHEET 2.
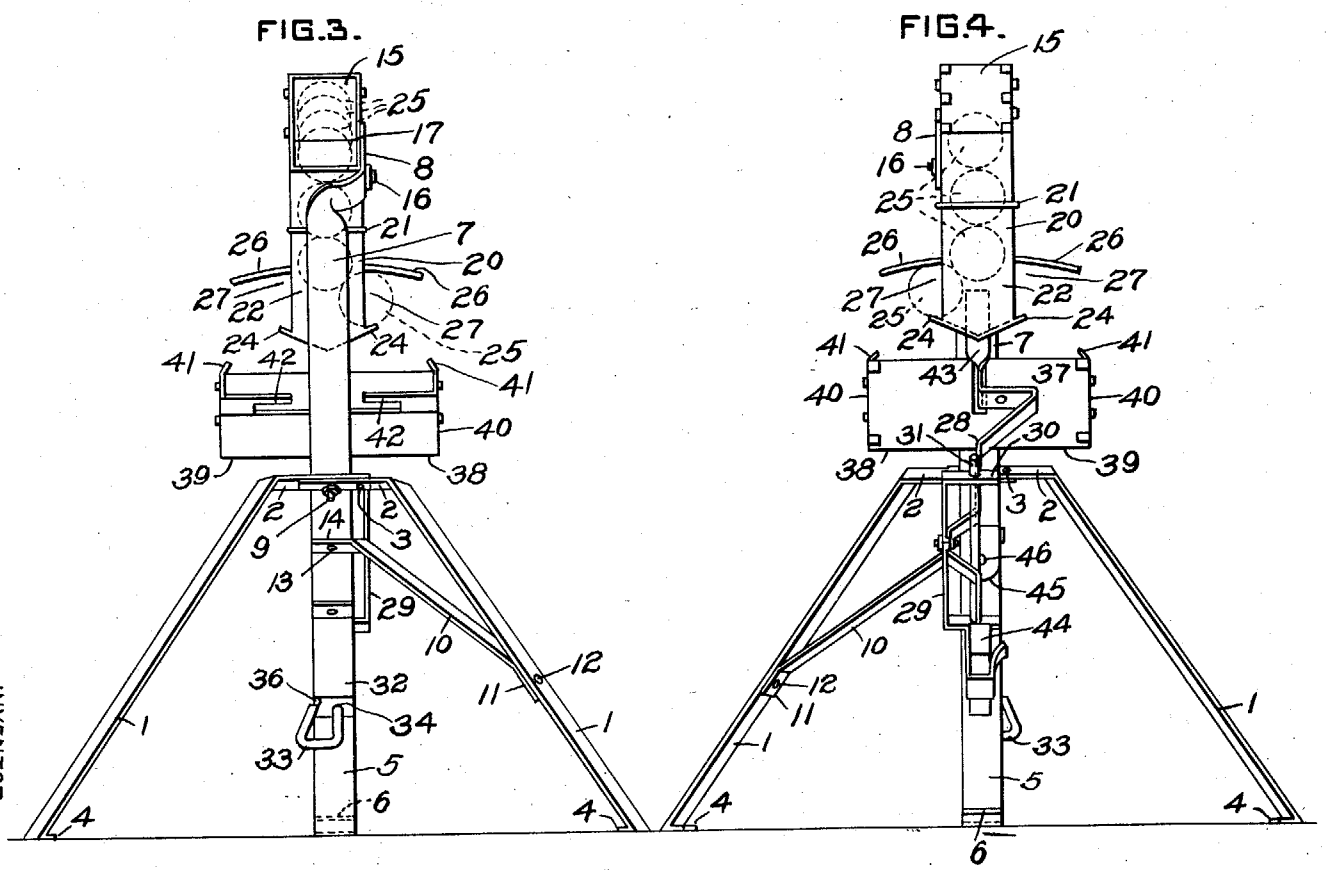
WITNESSES
J. Halsted Bradley.
INVENTOR
Vincent S. Gaines,
By Hunter & Brown,
Attorneys.

UNITED STATES PATENT OFFICE.

VINCENT STROTHER GAINES, OF WEBSTER GROVES, MISSOURI, ASSIGNOR TO BENJAMIN F. BAIN, OF PITTSBURGH, PENNSYLVANIA.

MECHANICAL TOY.

14,902. Specification of Reissued Letters Patent. Reissued June 29, 1920.

Original No. 1,301,552, dated April 22, 1919, Serial No. 230,118, filed April 22, 1918. Application for reissue filed March 20, 1920. Serial No. 367,366.

*To all whom it may concern:*

Be it known that I, VINCENT S. GAINES, a citizen of the United States, residing at Webster Groves, St. Louis county, and State of Missouri, have invented a new and useful Mechanical Toy, of which the following is a specification.

This invention relates to mechanical toys, and comprises the novel construction hereinafter disclosed.

An object of the invention is to provide a mechanical toy having an automatic action, that may be readily operated by unskilled persons, which will be durable and inexpensive in construction, and which may be folded or collapsed for packing in a small compass and readily set up for operation.

Another object of the invention is to provide a toy of the class mentioned including a load-receiving hopper, a movable member mounted in an inclined pivot having a load-receiving container at one end and a counterweight at the other end thereof, with means for discharging the load from the hopper into the container by successive automatic operations of the movable member thereby continuing the operation of the device until the load is discharged from the hopper.

With the foregoing additional features and advantages in view, the hereinafter disclosed construction has been produced, reference being made to the accompanying drawings, in which—

Figure 1 is a plan view of the toy embodying the invention.

Fig. 2 is a side elevation of the toy.

Fig. 3 is a front end elevation.

Fig. 4 is a rear end elevation.

In the embodiment of the invention disclosed in the drawings, the frame of the toy is shown as including a front supporting member comprising two legs 1 spaced apart and having inward extensions 2, the extensions 2 overlapping each other and being joined by a pivoted connection 3 so that they may be folded together when the device is disassembled. The extensions 2 are bent at an inclination backwardly from the horizontal plane of the upper extremities of the legs, so that the upper face thereof will be in the same inclined plane as the face of the rear support of the frame. The lower ends of the legs 1 are inturned to form supporting feet 4 so that the frame will rest evenly on a horizontal support. The rear support of the frame is formed from an elongated inclined strip 5 which extends rearwardly from the front support for a considerable distance in order to afford a solid support for the frame of the toy, preventing it from tipping over when operated. The rearward end of the strip 5 is up-turned to form a rest or foot 6 and the forward end of the strip 5 has an up-turned vertical extension 7 which is deflected at its upper end to form an inclined arm 8 upon which the hopper is supported. The strip 5 is connected with the overlapped extensions 2 by a removable bolt 9 so that the parts may be separated and folded for packing the toy.

A strut member 10 has one end deflected at 11 so as to match the inner face of one of the legs 1 to which it is pivoted at 12 and the other end deflected at 13 to match the under face of the strip 5 to which it is removably connected by a bolt 14.

A hopper comprising a rectangular trough 15 is pivoted at 16 to the supporting extension 8 on the frame. The end of the extension 8 has an in-turned tongue 17 which enters an opening 18 in the side wall of the hopper, so that when the device is assembled the hopper will be held rigidly in place in an inclined position, the angle of the inclination being toward the front of the device so that the load placed in the hopper will be moved by gravity toward the front of the hopper. The hopper has an opening 19 in its bottom near the front end below which opening is a delivery chute 20 which is connected with the hopper by a tongue and groove connection 21. The delivery chute 20 comprises front and rear walls 22 and side walls 23. The front and rear walls 22 have their lower edges inturned to form downwardly inclined flanges 24, the edges of the flanges on the front and rear wall being spaced a slight distance apart. These flanges constitute a support for the spherical objects 25 which constitute the load. The side walls of the chute are deflected outwardly at a point above the bottom of the chute thereby forming overhanging flanges 26 which act as guides for directing the movement of the spherical objects when they are discharged from the chute through the openings 27 formed at each side of the chute by the up-turning of the lower portion of the side walls 23.

A swinging member comprising a long arm 28 has removably connected therewith a bracket including a strip 29 which is deflected inwardly at its ends to form extensions 30, the strip 29 extending at right angles to the arm 28 and the extensions 30 having openings therein through which a pivot pin 31 extends. The pivot pin 31 is supported at its lower end in a U-shaped bracket 32 in an inclined position thereby forming an inclined axis upon which the swinging member is pivoted. The lower end of the pivot pin 31 is bent to form a U-shaped extremity 33 and is removably held in position in its support comprising holes 34 and 35 formed respectively in the base of the bracket 32 and through the strip 5. The edge of the base of the bracket 32 is notched at 36 so that the pin may be inserted with the free end of the U-shaped extremity extending through the notch 36 after which the pin is turned slightly, thereby retaining the pin in place when the device is assembled and permitting it to be removed when the device is taken down.

A container 37 for receiving the load from the chute is attached to the forward end of the arm 28. The container 37 comprises downwardly inclined bottom walls 38 and 39 and side walls 40. The side walls 40 are in-turned at their upper edge to form flanges 41 which constitute abutments for the spherical objects leaving the chute and deflecting them into the container. The width of the container 37 is such that it extends on either side of the chute for a sufficient distance to permit the spherical objects discharged from the chute to fall by gravity and be received in the container.

The walls 40 have formed thereon vertically extending and forwardly inclined guide strips 42 which are spaced apart at their ends a sufficient distance to permit the load received therein to be discharged when the swinging arm 28 reaches the lower end of its swing to the rear of the toy. The arm 28 at its forward end extends into the container and has an up-turned extension 43 which enters the space between the edges of the flanges 24 so that when the arm 28 is swung to a position in which the container is centered below the chute, the extension 43 will engage against the lower portion of the load in the chute and move it through the openings 27. A counterweight 44 is attached to the rear end of the arm 28, said counterweight being so adjusted that normally the arm 28 will be held in such a position that the container is centered below the chute. When the arm is given a slight swinging motion it will return with sufficient force through the agency of the counterweight to cause the extension 43 to contact with the lower portion of the load in the chute and discharge it into the container. When the load has been received in the container it over-balances the counterweight and the arm will swing upon its inclined pivot so that the container is brought to the rear portion of the toy, where the load will be discharged, the arm continuing its swing until the container is again centered below the chute.

Normally the action of the arm 28 will be a complete rotation from its normal position, but in order that the action of the toy may be varied I have provided a stop member comprising an abutment 45 pivoted at 46 to the upper face of the strip 5. This abutment may be adjusted so that when the rear end of the arm swings forwardly the counterweight will come in contact therewith and the movement of rotation of the arm will be reversed. When the abutment is moved to the side or from its forward position the counterweight will be free to pass beyond the point of the abutment and the cycle of rotation of the arm will continue in the same direction until the container is again centered below the chute.

I am aware that the principles of the invention may find embodiment in modified structure, and I do not limit myself therefore to the exact features shown and described, but what I claim and desire to secure by Letters Patent, is:—

1. A mechanical toy, comprising a frame, a hopper supported by said frame and provided with a discharge opening, a swinging arm supported by said frame, a container on one end of said arm for receiving a load from said hopper, a counterweight on the other end of said arm, and means for discharging the load from the hopper into said container, said arm being mounted on an inclined axis, whereby the counter-weight maintains said arm in position with the container underneath the discharge opening from the hopper and the deposit of a load in said container causes said arm to swing on its axis.

2. A mechanical toy, comprising a frame composed of vertical legs spaced apart, an elongated inclined support extending obliquely rearwardly of said legs, a hopper, a support for said hopper for maintaining the same in a position above the frame, a swinging arm, an inclined pivot for said swinging arm supported by said inclined rearwardly extending support, a container at one end of said arm, a counterweight at the other end of said arm, and means for discharging the load from said hopper into said container, the pivot for said arm being inclined, whereby the counter-weight maintains said arm in position with the container beneath the discharge opening from the hopper and the deposit of a load in said container causes said arm to swing on its axis.

3. A mechanical toy, comprising a frame, a hopper support formed in connection with said frame, a hopper carried by said support comprising an elongated inclined trough for receiving the load, a chute in connection with said hopper having means for supporting the load at the bottom of said chute and having openings at the side of said chute, a swinging arm pivoted to the frame and adapted to swing upon an inclined axis, a container for receiving the load from the chute at one end of said arm, a counterweight for holding said arm centered in respect of the chute, and means in connection with said arm adapted to eject the load from the chute to be received in said container.

4. A mechanical toy, comprising a collapsible frame, a hopper supported by said frame and provided with an opening to discharge the load therefrom, a swinging arm pivoted on an inclined axis, a load-receiving container carried by one end of said arm and adapted to discharge a load therefrom when said container is in a downward position, means for moving said container to position to receive a load from said hopper, and means for discharging a load from said hopper into said container.

5. A mechanical toy, comprising a frame, a hopper supported by said frame and provided with a discharge opening, an arm pivoted to swing on an inclined axis, a container at one end of said arm for receiving a load from said hopper, means for discharging a load from the hopper into said container, whereby said arm is caused to rotate about its inclined axis, a weight for normally holding said container in position to receive a load from said hopper, and a stop device for limiting the rotary movement of said swinging arm.

6. A mechanical toy, comprising a collapsible frame, a hopper supported by said frame and provided with a discharge opening, an arm pivoted to swing on an inclined axis, a container at one end of the arm, means for discharging a load from the hopper into said container, whereby said arm is caused to rotate about its inclined axis, and a weight for normally holding said container in position to receive a load from said hopper.

7. A mechanical toy, comprising a frame composed of foldable upright members and an inclined member extending downwardly and rearwardly from said upright members, an extension on the forward end of said inclined member constituting a hopper support, a hopper carried by said support and having a discharge opening, a swinging arm supported by said inclined member, a load-receiving receptacle carried by said arm, means for holding said arm normally in position with the load receiving receptacle beneath the delivery opening of the hopper, and means for discharging a load from the hopper into the receptacle, whereby said arm is moved on its pivot.

8. A mechanical toy, comprising a frame, a hopper supported in the upper part of said frame, a swinging arm mounted on said frame, a load-receiving receptacle, and means for discharging a load from said hopper into said load-receiving receptacle when the same is moved below the hopper from either side thereof, said arm being arranged to move about an inclined axis, whereby it is caused to swing when a load is deposited in said receptacle.

9. A mechanical toy, comprising a frame including upright members and an inclined member in connection therewith, a hopper mounted on a support above said frame, a support in connection with said inclined member, a pivot pin removably mounted in said support in an inclined position, an arm, a support in connection with said arm adapted to be received and pivoted upon said pivot pin, a container in connection with said arm, said container having a discharge opening for discharging the load therefrom when said container is in a downward position, means for normally holding said container to receive a load from said hopper, and means for discharging a load from the hopper into said container.

10. A mechanical toy, comprising a frame composed of collapsible supporting members, a swinging arm, an inclined pivot for said arm, a load-receiving hopper having a discharge opening arranged above said arm, a container carried by said arm, means for holding the container below the discharge opening of said hopper to receive the load therefrom, and means including an extending arm for contacting with the load delivered from said hopper, whereby the same is moved into said container.

11. A mechanical toy, comprising a supply receptacle, a load carrying receptacle having a swinging movement around an inclined axis, means for depositing a load in said carrying receptacle from said supply receptacle, thereby causing the carrying receptacle to swing away from the supply receptacle by gravity, and means for moving said carrying receptacle to position to receive another load from the supply receptacle.

12. A mechanical toy, comprising a supply receptacle, a load carrying receptacle having a swinging movement around an inclined axis, means for depositing a load in said carrying receptacle from said supply receptacle, thereby causing the carrying receptacle to swing away from the supply receptacle by gravity, and a counterweight for moving said carrying receptacle to loading position.

13. A mechanical toy, comprising a supply receptacle, a frame carrying a load-receiving receptacle and pivoted on an inclined axis, means for depositing a load in said carrying receptacle from said supply receptacle, thereby causing the carrying receptacle to swing downwardly and outwardly, a stop for limiting the downward and outwardly rotary movement of said swinging frame, and means for returning said carrying receptacle to loading position.

VINCENT STROTHER GAINES.